US012760740B2

(12) United States Patent
Fulayter et al.

(10) Patent No.: US 12,760,740 B2
(45) Date of Patent: Oct. 13, 2026

(54) IMPELLER

(71) Applicant: Beehive Industries, LLC, Centennial, CO (US)

(72) Inventors: Roy Fulayter, Avon, IN (US); Bradley J. Bocook, Columbus, OH (US); Michael Abraham Karam, Plainfield, IN (US)

(73) Assignee: Beehive Industries, LLC, Centennial, CO (US)

( * ) Notice: Subject to any disclaimer, the term of this patent is extended or adjusted under 35 U.S.C. 154(b) by 0 days.

(21) Appl. No.: 19/362,195

(22) Filed: Oct. 17, 2025

(65) Prior Publication Data

US 2026/0043409 A1 Feb. 12, 2026

Related U.S. Application Data

(63) Continuation of application No. PCT/US2024/033745, filed on Jun. 13, 2024.
(Continued)

(51) Int. Cl.
*F04D 19/00* (2006.01)
*F04D 29/32* (2006.01)
(Continued)

(52) U.S. Cl.
CPC ......... *F04D 19/002* (2013.01); *F04D 29/326* (2013.01); *F04D 29/329* (2013.01); *F04D 29/388* (2013.01); *B33Y 80/00* (2014.12)

(58) Field of Classification Search
CPC .... F04D 29/326; F04D 29/329; F04D 29/388; F01D 5/022
See application file for complete search history.

(56) References Cited

U.S. PATENT DOCUMENTS 3,768,933 A 10/1973 Bouiller et al.
3,897,001 A 7/1975 Helmintoller, Jr. et al.
(Continued)

FOREIGN PATENT DOCUMENTS

EP 0761979 A1 * 3/1997 ........... F04D 19/022

OTHER PUBLICATIONS

International Search Report and Written Opinion, International Patent Application No. PCT/US2024/033745, Aug. 30, 2024, 9 pgs.

*Primary Examiner* — Courtney D Heinle
*Assistant Examiner* — Danielle M. Christensen
(74) *Attorney, Agent, or Firm* — LOZA & LOZA, LLP; Michael I. Angert

(57) ABSTRACT

An apparatus includes a central structural member, a hub, and a plurality of strength members coupled to the central member and hub. The hub has a first diameter adjacent to an inflow end of the apparatus and a second diameter, larger than the first diameter, adjacent to an outflow end of the apparatus. A plurality of core blades are coupled to the hub on a side opposite to the plurality of strength members. Tips of the strength members are aligned with roots of the core blades. A shroud is configured radially outboard of the central structural member, the hub, the plurality of strength members, and the plurality of core blades. Tips of the core blades are coupled to the shroud. A plurality of bypass blades are coupled to the shroud on a side opposite to the plurality of core blades. All components are integrally formed and rotate as one unit.

19 Claims, 11 Drawing Sheets

Related U.S. Application Data

(60) Provisional application No. 63/507,901, filed on Jun. 13, 2023.

(51) Int. Cl.

| | |
|---|---|
| ***F04D 29/38*** | (2006.01) |
| *B33Y 80/00* | (2015.01) |

(56) References Cited

U.S. PATENT DOCUMENTS

| | | | | |
|---|---|---|---|---|
| 3,937,013 | A | 2/1976 | Aspinwall | |
| 3,953,147 | A | 4/1976 | Aspinwall | |
| 4,043,121 | A | 8/1977 | Thomas et al. | |
| 4,069,661 | A | 1/1978 | Rundell et al. | |
| 4,072,008 | A | 2/1978 | Kenworth et al. | |
| 4,285,194 | A | 8/1981 | Nash | |
| 5,105,616 | A | 4/1992 | Bornemisza | |
| 5,806,303 | A | 9/1998 | Johnson | |
| 5,867,980 | A | 2/1999 | Bartos | |
| 6,579,063 | B2 * | 6/2003 | Stairs | F04D 29/326 416/243 |
| 6,901,739 | B2 | 6/2005 | Christopherson | |
| 7,055,306 | B2 | 6/2006 | Jones | |
| 7,758,303 | B1 * | 7/2010 | Wadia | F02K 3/077 415/77 |
| 8,615,980 | B2 | 12/2013 | Agrawal et al. | |
| 9,868,155 | B2 | 1/2018 | Gerber et al. | |
| 9,926,883 | B1 | 3/2018 | Ress | |
| 11,994,144 | B2 * | 5/2024 | He | F04D 25/0613 |
| 2007/0154314 | A1 * | 7/2007 | Jarrah | F04D 29/327 416/203 |
| 2011/0135494 | A1 | 6/2011 | Nicgorski et al. | |
| 2015/0267543 | A1 * | 9/2015 | Gerber | B22F 5/009 416/212 R |
| 2019/0210111 | A1 | 7/2019 | Army et al. | |
| 2021/0071536 | A1 * | 3/2021 | Streeter | F01D 5/048 |
| 2022/0112900 | A1 | 4/2022 | Kempen et al. | |

* cited by examiner

IMPELLER

CROSS-REFERENCE TO RELATED APPLICATION

This application for patent is a continuation of and claims the benefit of International Application No. PCT/US2024/033745, filed in the United States Receiving Office on Jun. 13, 2024, which claims the benefit of U.S. Provisional Patent Application Ser. No. 63/507,901, filed in the United States Patent and Trademark Office on Jun. 13, 2023, both entitled "Impeller," the entire content of both applications is incorporated herein by reference as if fully set forth below in its entirety and for all applicable purposes.

TECHNICAL FIELD

Aspects described herein are generally related to jet engines and, more particularly, to impellers that split an air stream into a bypass air stream and a core air stream.

BACKGROUND

Aspects described herein relate to jet engines. In general, jet engines, particularly turbofan jet engines, include rotating sets of blades referred to as rotors and/or impellers and static sets of blades, referred to as stators and/or diffusers. In a turbofan jet engine, a first set of rotating blades may be fan blades designed to push a large volume of air into two distinct regions. The regions may be referred to herein as a bypass air region and a core air region.

Within the core air region is a compressor apparatus. The compressor apparatus may be designed to compress air, mix the compressed air with fuel, and ignite the air-fuel mixture. The ignited air-fuel mixture is expelled from the jet engine exhaust. The bypass air region exists outside of and is wrapped around the core air region. Air pushed into the bypass air region bypasses the core air region and is expelled from the jet engine around and alongside the ignited air-fuel mixture ejected from the jet engine exhaust. In the examples described herein, the pressure ratios of the fan blades and compressor blades may be comparable; accordingly, the fan blades described herein that push the air into and through the bypass air region may also be considered compressor blades.

The air that leaves the compressor enters a combustor where fuel is burned. The air and combustion products leave the combustor and rotate the turbine, which rotates the shaft and the compressor or fan blades. The exhaust air from the core air region and the air pushed through the bypass air region by the fan blades produce thrust. The combined thrust propels the jet engine (and, for example, the aircraft, vehicle, or missile to which the jet engine is attached) forward.

Engineers and scientists engage in ongoing work to improve the efficiency of jet engines and reduce their parts count.

BRIEF SUMMARY

The following summary is provided to facilitate an understanding of some of the innovative features unique to the examples disclosed and is not intended to be a full description. A full appreciation of the various aspects of the examples can be gained by taking the entire specification, claims, drawings, and abstract as a whole.

In one example, an apparatus (e.g., an impeller) is described. The apparatus includes a central structural member, a hub, a plurality of strength members coupled to the central structural member and the hub, a plurality of core blades coupled to the hub on a side opposite to the plurality of strength members, a shroud radially outboard of the central structural member, the hub, the plurality of strength members, and the plurality of core blades, the plurality of core blades coupled to the shroud and the hub, and a plurality of bypass blades coupled to the shroud on a side opposite to the plurality of core blades.

In another example, an apparatus (e.g., an impeller) is described. The apparatus includes a central structural member defining a longitudinal center axis and having an air inflow end and an air outflow end distal from the air inflow end, a plurality of strength members, each having a respective strength member root coupled to and extending from the central structural member, a respective strength member body extending from the respective strength member root, and a respective strength member tip extending from the respective strength member body distal from the respective strength member root, a hub having a hub inner surface, a spaced apart hub outer surface, a hub first diameter adjacent to the air inflow end, and a hub second diameter, larger than the hub first diameter, adjacent to the air outflow end, each respective strength member tip coupled to the hub inner surface, a plurality of core blades, each having a respective core blade root coupled to and extending from the hub outer surface, a respective core blade body, and a respective core blade tip distal from the respective core blade root, a hub thickness being interposed between a plurality of strength member tips and a plurality of core blade roots, a shroud having a shroud inner surface, a spaced apart shroud outer surface, each respective core blade tip coupled to the shroud inner surface, and a plurality of bypass blades each having a respective bypass blade root, a respective bypass blade body, and a respective bypass blade tip, each of the plurality of bypass blades coupled to and extending from the shroud outer surface.

These and other aspects will become more fully understood upon a review of the detailed description which follows. Other aspects, features, and examples will become apparent to persons having ordinary skill in the art upon reviewing the following description of specific examples in conjunction with the accompanying figures. While features may be discussed relative to particular examples and figures below, all examples can include one or more of the features discussed herein. In other words, while one or more examples may be discussed as having certain advantageous features, one or more of such features may also be used in accordance with the other examples discussed herein. Similarly, while examples may be discussed below in terms of a specific apparatus, device, system, or method, it should be understood that such examples can be implemented in various other apparatus, devices, systems, and methods.

BRIEF DESCRIPTION OF THE DRAWINGS

The accompanying figures, in which like reference numerals refer to identical or functionally similar elements throughout the separate views and which are incorporated in and form a part of the specification, further illustrate the examples and, together with the detailed description, serve to explain the aspects disclosed herein.

DETAILED DESCRIPTION

Figure 1:
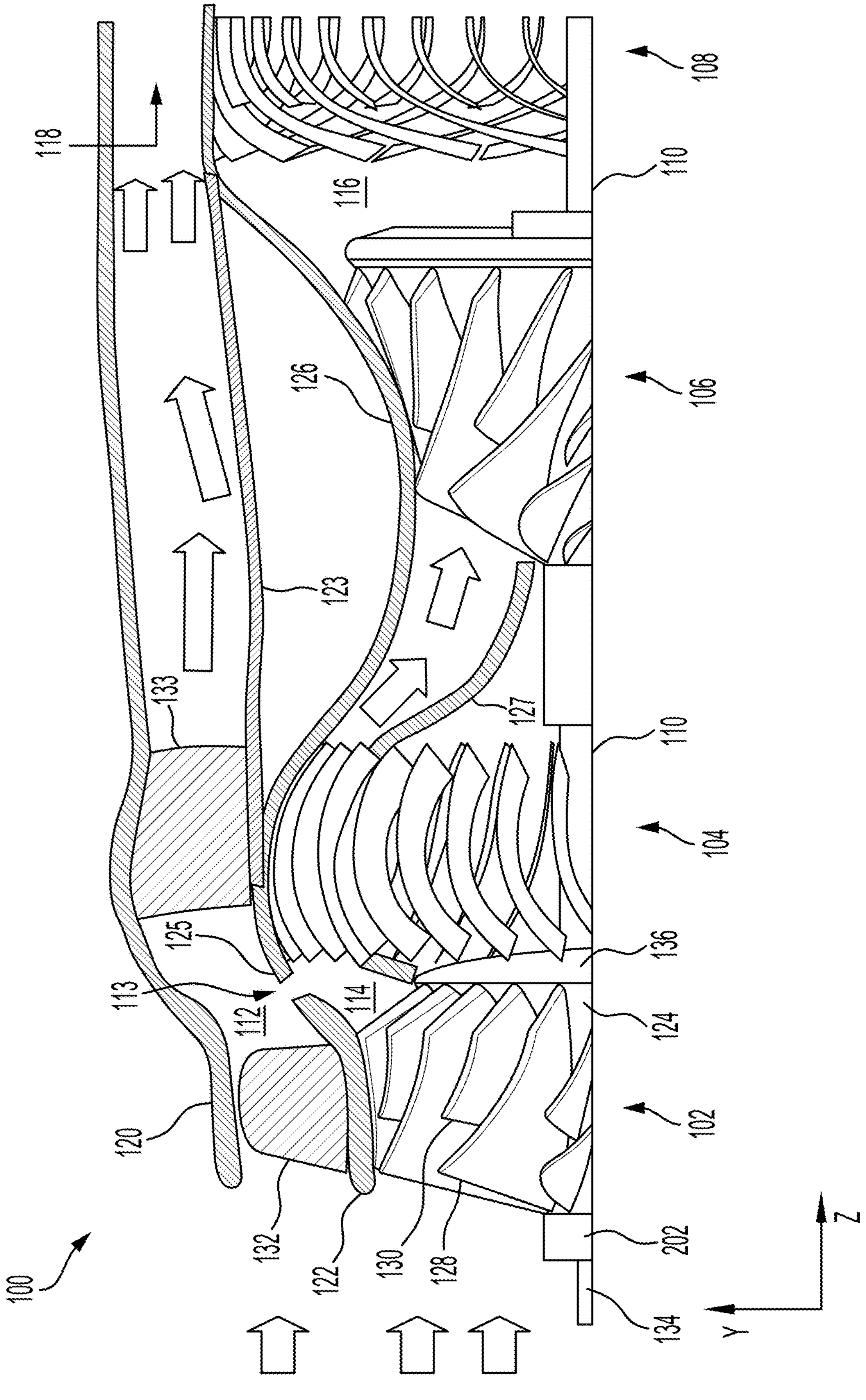
FIG. 1 is a partial cutaway cross-section right-side view of a portion of a turbofan jet engine utilizing an impeller according to some aspects of the disclosure.

The particular values and configurations discussed in the following non-limiting examples can be varied and are cited merely to illustrate one or more examples and are not intended to limit the scope thereof.

Examples will now be described more fully hereinafter with reference to the accompanying drawings. The examples disclosed herein can be modified within the scope of this disclosure and should not be construed as limiting; instead, these examples are provided so that this disclosure will be thorough and complete and fully convey the scope of the disclosure to persons having ordinary skill in the art. Like numbers refer to like elements throughout.

The detailed description set forth below in connection with the appended drawings is intended as a description of various configurations and is not intended to represent the only configurations in which the concepts described herein may be practiced. The detailed description includes specific details to provide a thorough understanding of various concepts. However, it will be apparent to persons having ordinary skill in the art that these concepts may be practiced without these specific details. In some examples, well-known structures and components are shown in block diagram form in order to avoid obscuring such concepts.

The terminology used herein is for the purpose of describing particular examples only and is not intended to be limiting. As used herein, the singular forms “a,” “an,” and “the” are intended to include the plural forms as well unless the context clearly indicates otherwise. It will be further understood that the terms “comprise” and/or “comprising,” when used in this specification, specify the presence of stated features, values, steps, operations, elements, components, and/or groups thereof but do not preclude the presence or addition of one or more other features, values, steps, operations, elements, components, and/or groups thereof.

Throughout the specification and claims, terms may have nuanced meanings suggested or implied in context beyond an explicitly stated meaning. Likewise, the phrase “in one example,” as used herein, does not necessarily refer to the same example, and the phrase “in another example” does not necessarily refer to a different example. It is intended that the scope of the disclosure may encompass the subject matter of one or more examples in whole or in part.

Unless otherwise defined, all terms (including technical and scientific terms) used herein have the same meaning as commonly understood by one of ordinary skill in the art. It will be further understood that terms, such as terms defined in commonly used dictionaries, should be interpreted as having a meaning that is consistent with their meaning in the context of the relevant art and will not be interpreted in an idealized or overly formal sense unless expressly so defined herein.

It will be understood that particular examples described herein are shown by way of illustration and not limitation. Aspects described herein can be employed in various examples without departing from the scope of the disclosure. Those persons having ordinary skill in the art will recognize or be able to ascertain that numerous equivalents to the specific aspects and procedures described herein may exist. Such equivalents are considered to be within the scope of this disclosure and are covered by the claims.

The word “a” or “an,” when used in conjunction with the term “comprising” may mean “one.” Still, the use of the word “a” or “an” when used in conjunction with the term “comprising” may also be consistent with the meaning of “one or more,” “at least one,” and “one or more than one.” The term “or” may be used to mean “and/or” unless explicitly indicated to refer to alternatives only or the alternatives are mutually exclusive, although the disclosure supports a definition that refers to only alternatives and “and/or.”

As used in this specification and claim(s), the words “comprising” (and any form of comprising, such as “comprise” and “comprises”), “having” (and any form of having, such as “have” and “has”), “including” (and any form of including, such as “includes” and “include”) or “containing” (and any form of containing, such as “contains” and “contain”) are inclusive or open-ended and do not exclude additional, unrecited elements or method steps.

The term “or combinations thereof” as used herein refers to all permutations and combinations of the listed items preceding the term. For example, “A, B, C, or combinations thereof” is intended to include at least one of: A, B, C, AB, AC, BC, or ABC, and if the order is inferred or described in a particular context, also BA, CA, CB, CBA, BCA, ACB, BAC, or CAB. Continuing with this example, expressly included are combinations that contain repetition of one or more items or terms, such as BB, AAA, AB, BBC, AAABCCCC, CBBAAA, CABABB, and so forth. Persons having ordinary skill in the art will understand there is no limit on the number of items or terms in any combination unless otherwise apparent from the context.

All aspects disclosed and claimed herein may be made and executed without undue experimentation in light of the present disclosure. While the aspects have been described in terms of preferred examples, it will be apparent to persons having ordinary skill in the art that variations may be applied to the aspects described herein without departing from the concept, spirit, and scope of the disclosure and claims. All similar variations, substitutes, and modifications apparent to those persons having ordinary skill in the art are deemed to be within the spirit, scope, and concept of the disclosure as defined by the appended claims.

In some examples, jet engine rotor blades and diffuser blades, along with the shaft and cowlings or other ducts and channels of the jet engine, may be made of metal. However, they may be made of different materials such as, for example, and without limitation, composite materials, carbon fiber, or plastic. Often, metal parts are machined from solid billets of metal, or they may be made of sheet metal or metal plates that may be braised or welded together. Often, individual blades of the fan and individual compressor blades are manufactured, inspected to exact tolerances, and individually inserted into a rotatable structure (e.g., a disk-shaped rotatable structure) coupled to a jet engine shaft. The work may be exacting, demand great care and precision, and be time-consuming.

Described herein are three-dimension (3D) printed components for jet engines, including an impeller with several pluralities of different types of blades and a shroud (also referred to herein as a rotating shroud because the shroud may be integrally formed with the impeller and therefore rotates with the impeller) that divides incoming air and pushes (by rotating action of a plurality of bypass blades and a separate plurality of core blades) a first portion of the incoming air into a bypass air region of a jet engine and a second portion of the incoming air into a core air region of a compressor stage of the jet engine. The entirety of the shroud, the plurality of bypass blades, the plurality of core blades, and the hub (along with internal support members and a central structural member) may be 3D printed as an integral impeller apparatus. The 3D printing may be performed using 3D printed metal. The metal 3D-printed integral impeller apparatus may be configured to operate in rigorous, high mechanical stress and high rotational speed demanding applications. Some applications of the impeller apparatus may include military applications in which a jet engine utilizing the impeller apparatus exemplified herein may propel a weapon, aircraft, or vehicle and may need to operate for several hours.

FIG. 1 is a partial cutaway cross-section right-side view of a portion of a turbofan jet engine (referred to herein as the jet engine 100) utilizing an impeller 102 according to some aspects of the disclosure. There is no limit to the number of stages of the jet engine 100 used in connection with the impeller 102. The illustrated features of the jet engine 100 include the impeller 102 (also referred to as a rotor), a first diffuser 104 (also referred to as a first stage stator), a compressor impeller 106 (also referred to as a compressor rotor), a second stage diffuser 108 (also referred to as a second stator), and a compressor shaft 110. The impeller 102 may be an example of the metal 3D-printed integral impeller apparatus described above. Of course, 3D-printed impellers, such as those described herein, are not limited to being manufactured of metal; a 3D-printed impeller may be made of other materials, such as, for example, and without limitation, composite materials, carbon fiber, or plastic.

Air, represented by block arrows, enters the impeller 102 and is divided into a first stream that enters a bypass air region 112 and a second stream that enters a core air region 114. Air entering the core air region 114 flows through the first diffuser 104, is directed to the compressor impeller 106, and emerges from the compressor impeller in compressed air region 116. Air in the bypass air region 112 is directed to a bypass duct, such as the bypass duct 118 depicted in FIG. 1.

Facing walls of a stationary (with respect to the impeller 102) outer cowling 120 and a shroud 122 (also referred to herein as a rotating shroud because, in the examples described herein, the shroud 122 may be integral to the impeller 102 and therefore rotates with the impeller 102) define some borders of the bypass air region 112 adjacent to the shroud 122 and within a region occupied by a bypass blade (of a plurality of bypass blades 132) of the impeller 102. Facing walls of the stationary outer cowling 120 and a first inner wall 123, deeper within the jet engine 100, define additional borders of the bypass air region 112. Facing walls of the shroud 122 and a hub 124 define some borders (e.g., boundaries) of the core air region 114 within a region occupied by a plurality of core blades 128 and a plurality of splitter blades 130 of the impeller 102. A second inner wall 126 may define an outer border of the core air region 114 deeper within the jet engine 100. The compressed air region 116 follows the compressor impeller 106. A gap 113 (e.g., a spaced-apart configuration) exists between the shroud 122 and a leading edge 125 (formed at a junction of the first inner wall 123 and the second inner wall 126). The leading edge 125, the first inner wall 123, the second inner wall 126, the third inner wall 127, and the first diffuser 104 may be fixed to one another and remain stationary relative to the shroud 122 (which rotates with the impeller 102 due to the coupling of the shroud 122 to the plurality of core blades 128 and the plurality of splitter blades 130). Accordingly, to facilitate the rotation of the shroud 122, the shroud 122 and the leading edge 125 have a spaced-apart configuration (e.g., the gap 113).

The impeller 102 includes a central structural member 202 (FIG. 2), the hub 124, the plurality of core blades 128, the plurality of splitter blades 130, the shroud 122, and the plurality of bypass blades 132. An optional stub shaft, such as the stub shaft 134, may be included with the impeller 102 in examples where a starter/generator may be coupled (e.g., via a power take-off coupling (not shown)) to the impeller 102 via the stub shaft 134 at the air inflow end 418 (FIG. 4) of the impeller 102. In examples where the starter/generator is located at the aft end of an engine, the stub shaft 134 may be omitted. A backplate 136 may be a feature of the impeller 102. As depicted in the example, the backplate 136 may be located opposite and distal from the stub shaft 134, on an air outflow end 420 (FIG. 4) of the impeller 102.

The central structural member 202 (FIG. 2), which is an integral part of the impeller 102, is formed integrally with at least the hub 124, the plurality of core blades 128, the plurality of splitter blades 130, the shroud 122, the plurality of bypass blades 132, and the stub shaft 134. In some examples, the backplate 136 may be formed integrally with the central structural member 202, the hub 124, the plurality of core blades 128, the plurality of splitter blades 130, the shroud 122, the plurality of bypass blades 132, and the stub shaft 134. In some examples, the backplate 136 may be formed separately and coupled to the impeller 102. A bypass diffuser vane 133 is depicted as being fixed to the outer cowling 120 and the first inner wall 123. The bypass diffuser vane 133 may slow the speed of the air which passes it. In general, the bypass diffuser vane 133 may take the air that was swirled up by the impeller 102 and converts (e.g., returns) the air traveling in a swirling flow to air traveling in an axially directed flow.

Figure 9B:
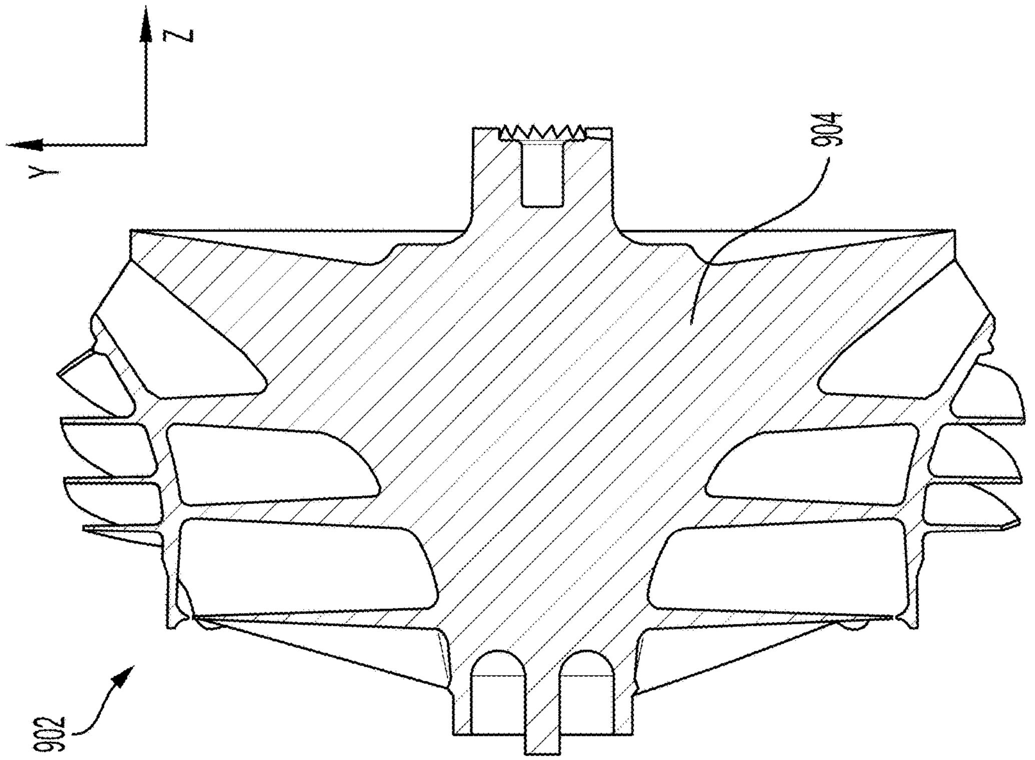
FIGS. 9A and 9B are side-by-side right-side cross-section views of two types of impellers according to some aspects of the disclosure.
Figure 9A:
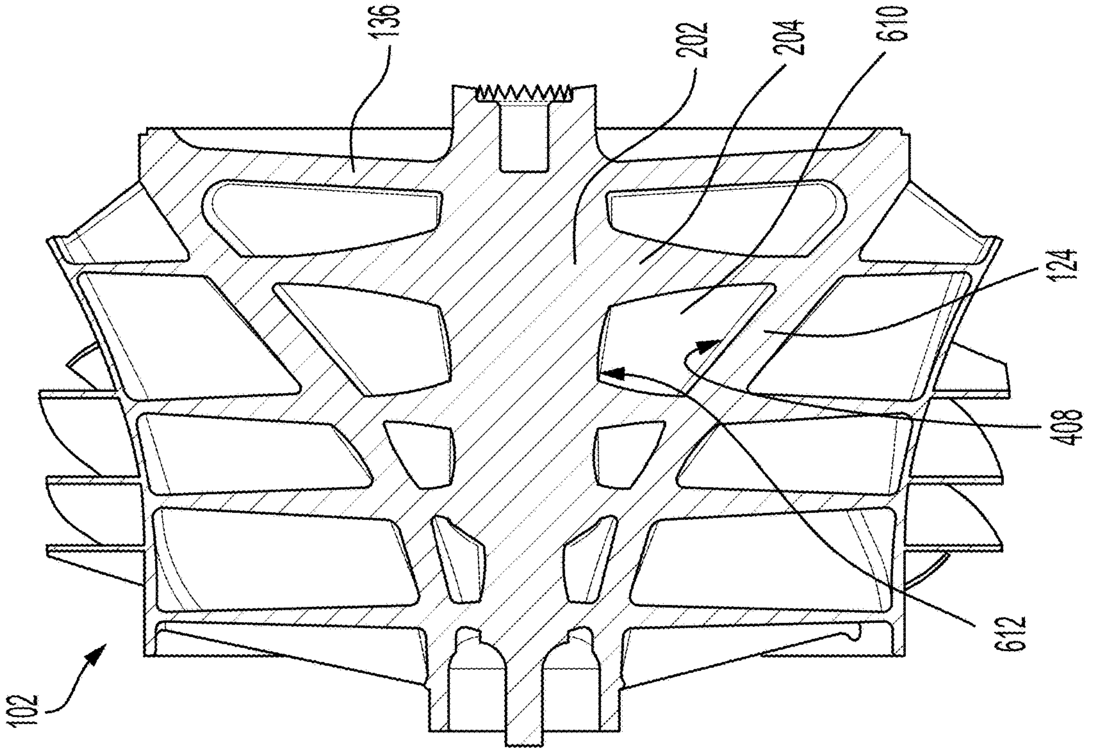

According to some aspects, the plurality of splitter blades 130 may cover the full (e.g., entire, whole, total, complete) axial length (e.g., the longitudinal length) of the hub 124 (in the case of the impeller 102 as illustrated in FIG. 9A), or a solid hub 904 (in the case of the second impeller 902 of FIG. 9B).

According to some aspects, the stub shaft 134 may be utilized, for example, to couple to a starter generator/motor (not shown). When the jet engine 100 is started, the starter generator/motor may operate to provide rotational torque to rotate the entirety of the impeller 102 and the compressor shaft 110, which is coupled to an end of the central structural member 202. Once the jet engine 100 is ignited, the starter generator/motor may be operated as an electric generator, generating, and supplying electricity to the jet engine 100 and other components coupled to the jet engine 100. Accordingly, the stub shaft 134 may allow for a power take off (PTO) coupling (not shown) to be positioned between the stub shaft 134 and the starter generator/motor (not shown). A set screw (not shown) may assist in securing the PTO coupling (not shown) to the stub shaft 134.

Figure 2:
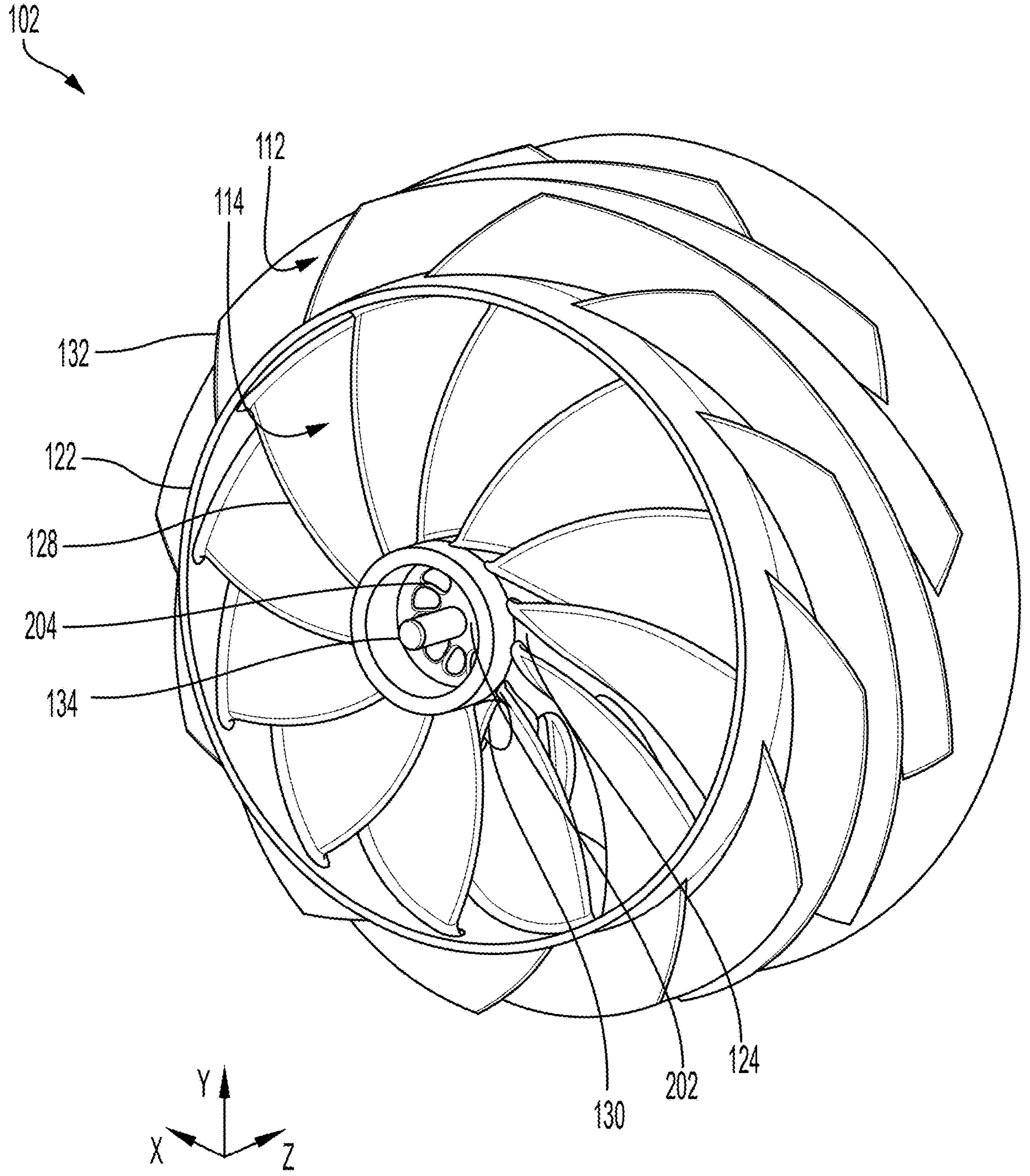
FIG. 2 is a top-right-front-perspective view of the impeller of FIG. 1 according to some aspects of the disclosure.

FIG. 2 is a top-right-front-perspective view of the impeller 102 of FIG. 1 according to some aspects of the disclosure. In greater detail, the impeller 102 includes the shroud 122, the stub shaft 134 (which may be optional), a plurality of strength members 204 (also referred to as spokes, load transfer members, or radial members), the plurality of core blades 128, the plurality of splitter blades 130, and the plurality of bypass blades 132.

According to some aspects, the shroud 122 may be axisymmetric. The shroud 122 may be an integral feature of the impeller 102 and thus rotates with and is integrally formed with the central structural member 202. The shroud 122 may serve as a dividing wall between the bypass air region 112 and the core air region 114 (as illustrated in FIG. 1).

As used herein, without any limiting intentions, the bypass air stream (also known as the hub bypass stream and tip bypass stream) refers to a first air stream that is drawn across the outer surface of the shroud 122 via the plurality of bypass blades 132; the bypass air stream, therefore, refers to the air flowing within the bypass air region 112 as shown in FIG. 1. The bypass air stream may be understood as being directed to bypass ducts, such as bypass duct 118 as shown and described in connection with FIG. 1.

As used herein, without any limiting intentions, the core air stream (also known as the hub core stream and tip core stream) refers to a second air stream that is drawn into the impeller 102 via the plurality of core blades 128 (and the plurality of splitter blades 130); the core air stream, therefore, refers to the air flowing within the core air region 114 as shown in FIG. 1. Core air is directed to a core of a turbofan jet engine. As indicated above, the core air region 114 may be defined between an inner wall of the shroud 122 and an outer surface of the hub 124 (e.g., as depicted in the example of the impeller 102 of FIGS. 1-6 and 9A), or an outer surface of the solid hub 904 (e.g., as depicted in the example of the second impeller 902 of FIG. 9B). The hub 124 and the central structural member 202 may be coaxial with the stub shaft 134. The plurality of core blades 128 may be positioned within the core air region 114 of the impeller 102.

Figure 3:
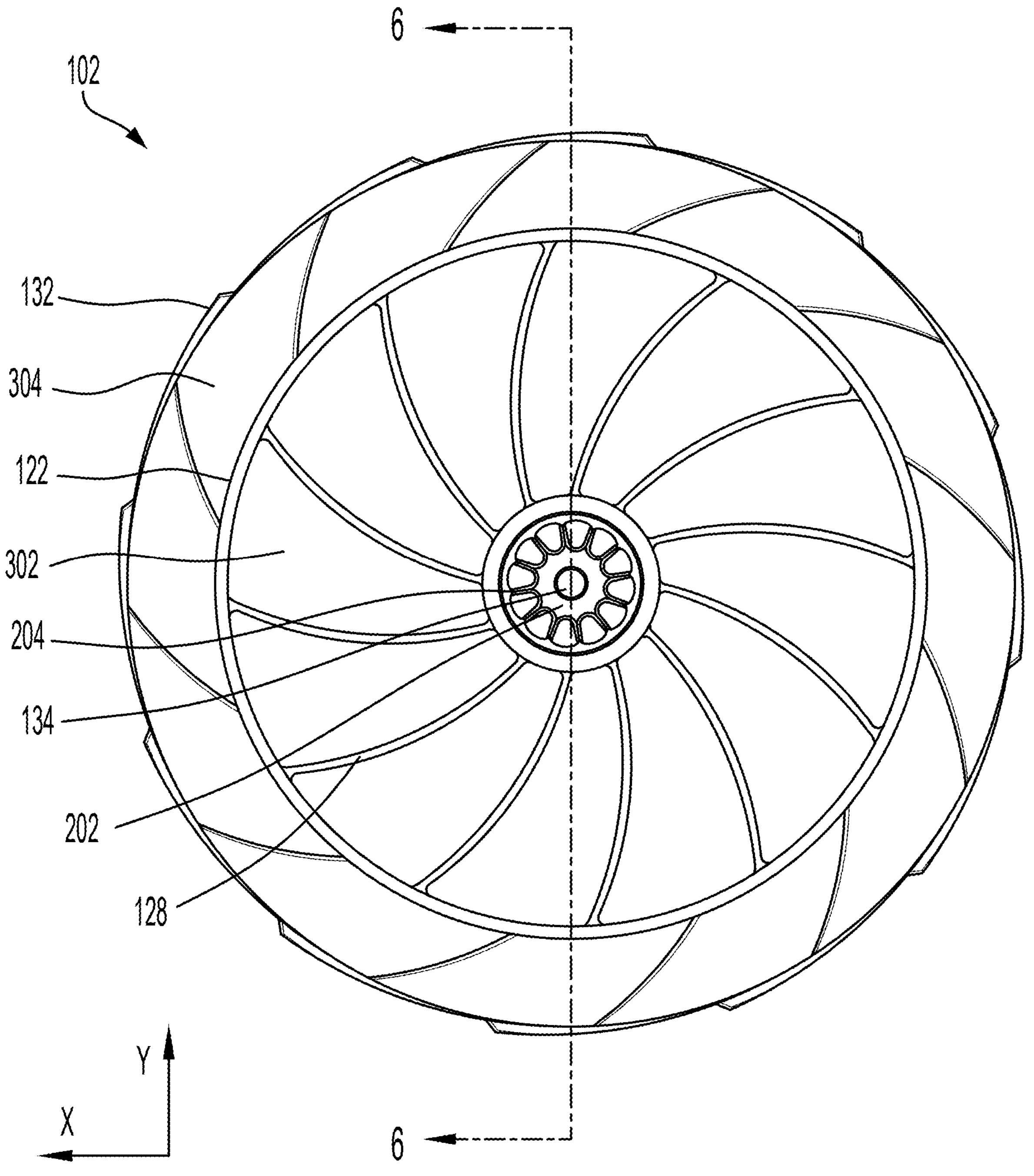
FIG. 3 is a front view of the impeller of FIGS. 1 and 2 according to some aspects of the disclosure.
Figure 6:
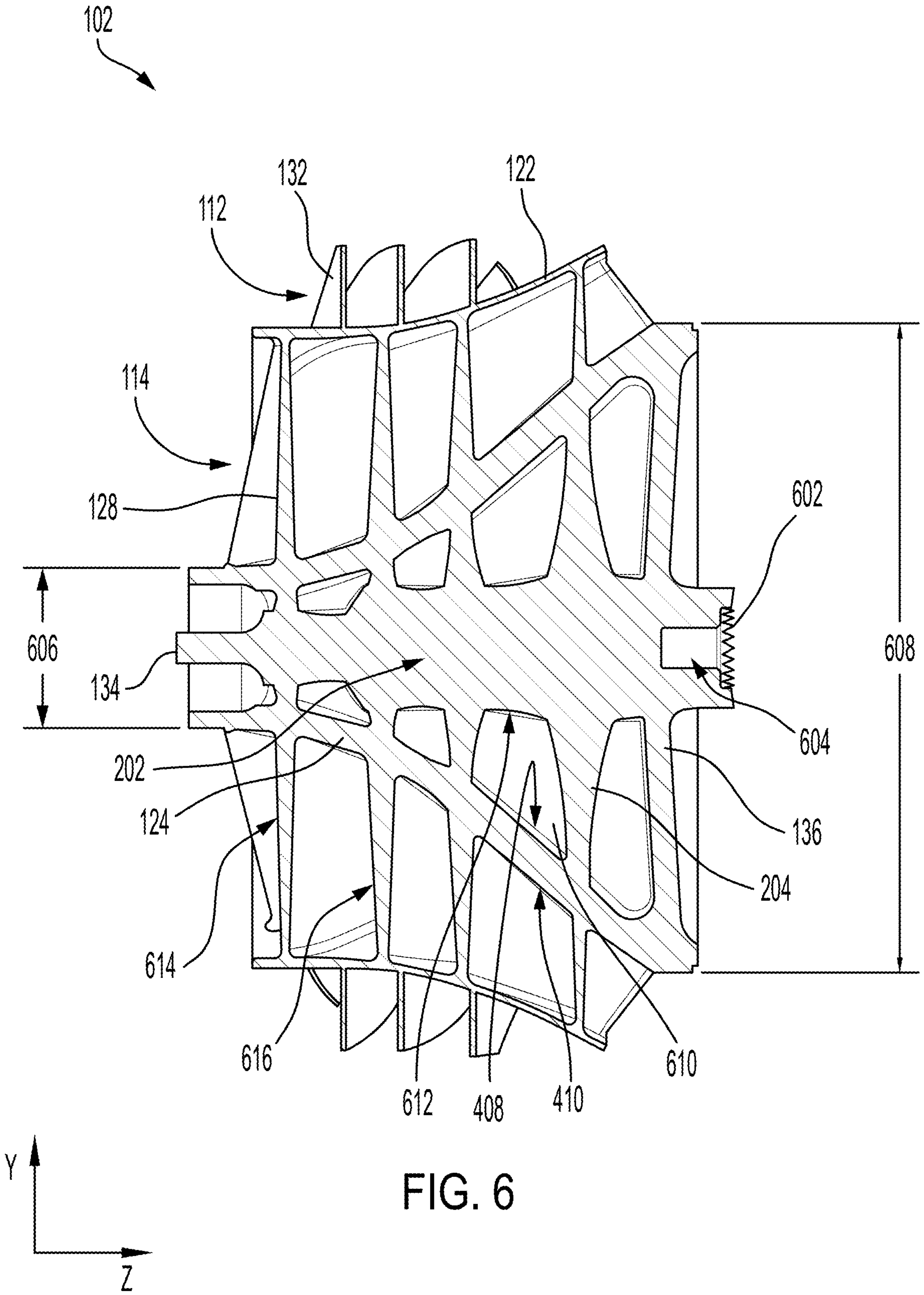
FIG. 6 is a right-side cross-section view of the impeller of FIGS. 1, 2, 3, 4, and 5 according to some aspects of the disclosure.

FIG. 3 is a front view of the impeller 102 of FIGS. 1 and 2 according to some aspects of the disclosure. The features of the impeller 102, as illustrated in FIG. 3 include the shroud 122, the stub shaft 134 (which may be optional), the central structural member 202, the plurality of strength members 204, the plurality of core blades 128, a core blade surface 302, the plurality of bypass blades 132, and a bypass blade surface 304. A bisecting location of a cross-sectional plane 6-6, shown in elevation view in FIG. 6, is identified in FIG. 3.

Figure 4:
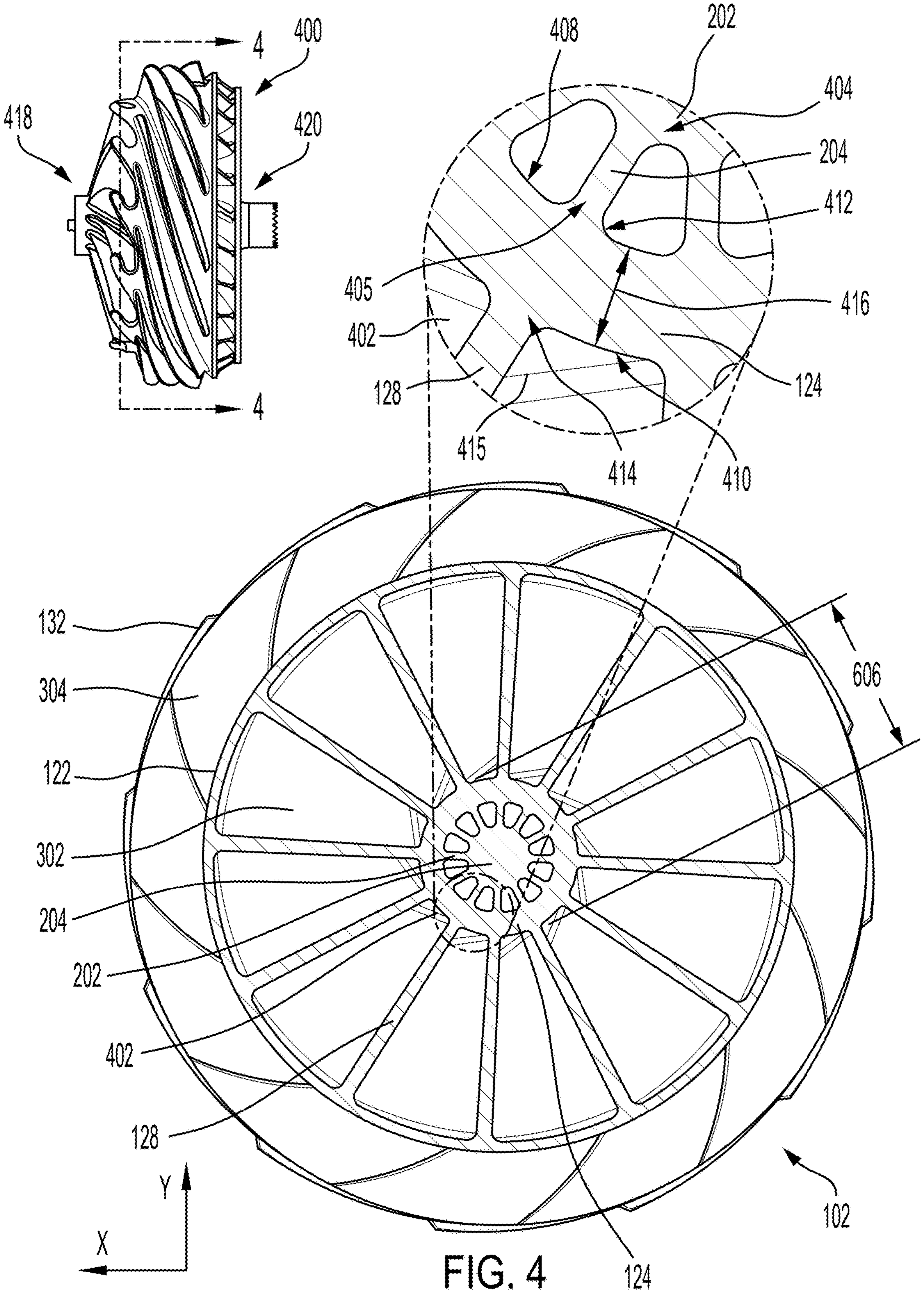
FIG. 4 is a front cross-section view of the impeller of FIGS. 1, 2, and 3 according to some aspects of the disclosure.

FIG. 4 is a front cross-section view of the impeller 102 of FIGS. 1, 2, and 3 according to some aspects of the disclosure. The cross-section is taken in the plane 4-4 as illustrated in the inset representation 400 of a side view of the impeller 102 in the upper left corner of FIG. 4. The cross-section is taken in front of the plurality of splitter blades 130, which are not shown in FIG. 4 as the cross-section of FIG. 4 did not bisect the plurality of splitter blades 130. The features of the impeller 102 illustrated in FIG. 4 include the shroud 122, the hub 124, the central structural member 202, the plurality of strength members 204, the plurality of core blades 128 (each having a core blade surface 302), and the plurality of bypass blades 132 (each having a bypass blade surface 304).

The central structural member 202 may be solid, as shown in FIG. 4. In some examples, a shaft bore hole (not shown) (e.g., a through hole coaxial with the longitudinal center axis of the central structural member 202 and configured to receive a through shaft) may be included; however, if included the bore stress, associated with a through shaft, could be higher than the material strength of the shroud 122 with the plurality of bypass blades 132 loads transferred radially inward. If a through shaft was used in some examples, the rotational speed of the impeller with the through shaft might be reduced in comparison to the rotational speed of the impeller 102 of FIG. 1 to stay within material strengths (given the same materials were used with the impeller with a through shaft (not shown) and with the impeller 102 of FIG. 1).

As illustrated in the dashed circle 402 of FIG. 4, in this example, the plurality of core blades 128 radially align with the plurality of strength members 204, respectively. Aligning the plurality of strength members 204 with the plurality of core blades 128 may minimize stress. The aligned structure may have less core stress (compared to an unaligned structure) because the stress is directed into the central structural member 202 via the plurality of core blades 128 and the plurality of strength members 204 (which are aligned).

According to some aspects described herein, the impeller 102 may utilize a central structural member 202 with no shaft (and, therefore, no shaft borehole in the central structural member 202). If present, the shaft would increase the stress applied to the central structural member 202 (as material would be removed from the center of the hub 124 to receive the shaft) or decrease the amount of stress that the central structural member 202 might tolerate. If a shaft were utilized (i.e., a shaft received in the central structural member 202 along the longitudinal axis), the stress would increase and be more likely to grow beyond the yield stress of the material used to 3D print the central structural member 202 (and the entirety of the impeller 102). If a shaft were utilized, the utilization might go hand-in-hand with lower rotational speeds, lower temperatures, or both lower rotational speeds and temperatures.

The impeller 102 may include a central structural member 202 defining a longitudinal center axis and having an air inflow end 418 and an air outflow end 420 distal from the air inflow end 418.

The impeller 102 may include the plurality of strength members 204 (which, when viewed one slice at a time, may appear as a plurality of spokes emanating from the central structural member 202), each of the plurality of strength members 204 may have a strength member root 404 coupled to (e.g., indirectly, directly, or integrally formed with) and extending from the central structural member 202, a strength member body 405 extending from the respective strength member root 404, and a respective strength member tip 412 extending from the respective strength member body 405 distal from the respective strength member root 404.

The impeller 102 may include a hub 124 having a hub inner surface 408, a spaced apart hub outer surface 410, a hub first diameter 606 (FIG. 6) adjacent to the air inflow end 418, and a hub second diameter 608, larger than the hub first diameter 606 (FIG. 6), adjacent to the air outflow end 420, each respective strength member tip 412 (of the plurality of strength members 204) coupled to (e.g., indirectly, directly, or integrally formed with) the hub inner surface 408.

The impeller 102 may include the plurality of core blades 128, each having a respective core blade root 414 coupled to (e.g., indirectly, directly, or integrally formed with) and extending from the hub outer surface 410, a respective core blade body 415, and a respective core blade tip 506 (FIG. 5) distal from the respective core blade root 414, a hub thickness 416 interposed between a plurality of strength member tips (similar to strength member tip 412) and a plurality of core blade roots (similar to core blade root 414). The core blade root 414, core blade tip 506 (FIG. 5), and core blade body 415 may be formed as a continuous core blade (similar to 1028, FIG. 10).

Figure 5:
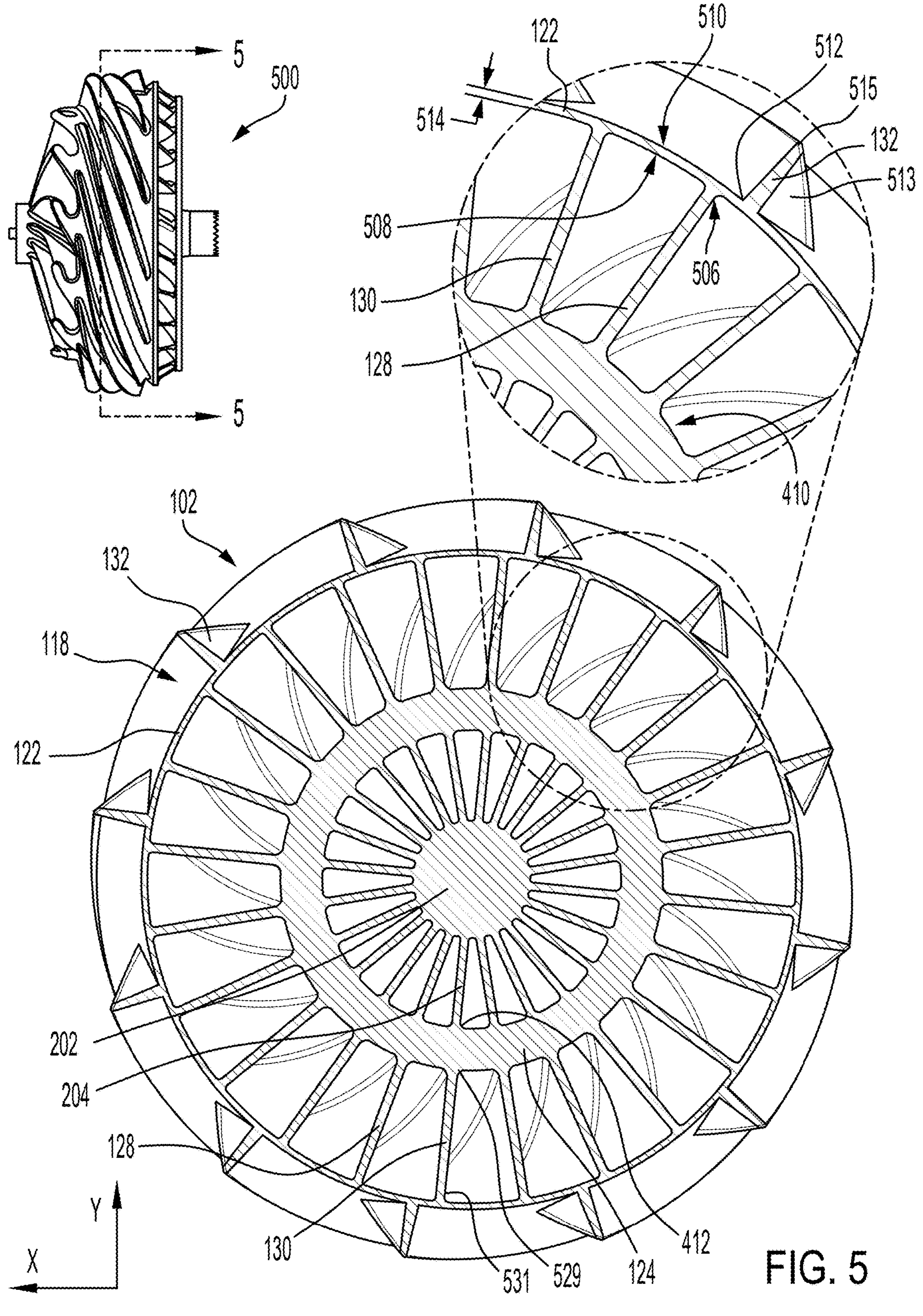
FIG. 5 is a front cross-section view of the impeller of FIGS. 1, 2, 3, and 4 according to some aspects of the disclosure.

The impeller 102 may include a shroud 122 having a shroud inner surface 508 (FIG. 5) and a spaced apart shroud outer surface 510 (FIG. 5). Each respective core blade tip 506 may be coupled to the shroud inner surface 508.

The impeller 102 may include a plurality of bypass blades 132, each having a respective bypass blade root 512 (FIG. 5), a respective bypass blade body 513 (FIG. 5), and a respective bypass blade tip 515 (FIG. 5). Each of the plurality of bypass blades 132 coupled to and extending from the shroud outer surface 510. The bypass blade root 512, bypass blade tip 515, and bypass blade body 513 may be formed as a continuous bypass blade. In some examples, each of the plurality of bypass blades 132 may be integrally formed with the shroud 122. In some examples, a shroud thickness 514 may be interposed between the respective core blade tip 506 and a respective bypass blade root 512.

According to some aspects, the strength member body 405 may be a curved strength member body, and the core blade body 415 may be a curved core blade body.

According to some aspects of the disclosure, the central structural member 202, the plurality of strength members 204, the hub 124, the plurality of core blades 128, the shroud 122, and the plurality of bypass blades 132 may be 3D printed as an integral unit. In some examples, the integral unit may be 3D printed with metal.

In some examples, the respective ones of a plurality of core blade tips 506 may be unaligned with the respective ones of a plurality of bypass blade roots 512. In some examples, a respective core blade root 414 may be aligned with a respective strength member tip 412.

In some examples, the central structural member 202, the plurality of strength members 204, the hub 124, the plurality of core blades 128, the shroud 122, the plurality of bypass blades, and the plurality of splitter blades 130 are three-dimensionally (3D) printed as an integral unit. In some examples, the impeller 102 may also include a backplate 136 coupled to the trailing edges of the plurality of core blades 128, the plurality of splitter blades 130, the central structural member 202, and the hub 124. In some examples, the central structural member 202, the plurality of strength members 204, the hub 124, the plurality of core blades 128, the shroud 122, the plurality of splitter blades 130, the plurality of bypass blades 132, and the backplate 136 are three-dimensionally (3D) printed as an integral unit. According to one aspect, a first configuration of the plurality of bypass blades 132 may be independent of a second configuration of the plurality of core blades 128. According to one aspect, the central structural member 202, the hub 124, and the plurality of strength members 204 may form one solid hub (a solid unit) having the hub outer surface 410. That is, the central structural member 202, the hub 124, and the plurality of strength members 204 may be formed as one solid hub (a solid unit) having the hub outer surface 410. According to one aspect, the central structural member 202 and the hub 124 form one solid hub (a solid unit), in an absence of the plurality of strength members 204. That is, the central structural member 202 and the hub 124 are formed as one solid hub (a solid unit) having the hub outer surface 410 in an absence of the plurality of strength members 204.

FIG. 5 is a front cross-section view of the impeller 102 of FIGS. 1, 2, 3, and 4 according to some aspects of the disclosure. The cross-section is taken in plane 5-5 as illustrated in the inset representation 500 of a side view of the impeller 102. The features of the impeller 102 illustrated in FIG. 5 include the central structural member 202, the plurality of strength members 204, the hub 124, the plurality of core blades 128, the shroud 122, and the plurality of bypass blades 132. Also identified are the examples of the bypass duct 118, the hub outer surface 410, the core blade tip 506, the shroud inner surface 508, the shroud outer surface 510, the bypass blade root 512, and the shroud thickness 514.

As illustrated in FIG. 5, the central structural member 202 is a central structural member of the impeller 102. The central structural member 202 may be solid; a shaft borehole may not be needed because the impeller 102 may not be mounted to a shaft.

In the example of the cross-section of FIG. 5, the plurality of core blades 128 radially align with the plurality of strength members 204.

As FIG. 5 illustrates, as the plane of the cross-section of the impeller 102 moves toward the air outflow end 420 of the impeller 102, the cross-sectional area of the core air region 114 reduces. The reduction may be realized because the cross-sectional area that accommodates the air decreases as the air compresses.

As FIG. 5 illustrates, the diameter of the central structural member 202 increases as the plane of the cross-section of the impeller 102 moves toward the air outflow end 420 of the impeller 102. The cross-section of FIG. 5 bisects both the plurality of core blades 128 and the plurality of splitter blades 130; accordingly, the number of blades per volume increases (in the example of FIG. 5, the number doubles as the cross-section includes twelve core blades (i.e., the plurality of core blades 128) and twelve splitter blades (i.e., the plurality of splitter blades 130), resulting in a total of twenty-four blades). The diameter of the central structural member 202 increases to accommodate the increased number of blades.

In some examples, the impeller 102 may include a plurality of splitter blades 130, each having a respective splitter blade root 529 coupled to and extending from the hub outer surface 410 and a respective splitter blade tip 531 distal from the respective splitter blade root 529. The respective splitter blade root 529 may be aligned with a strength member tip 412 of a corresponding respective strength member of the plurality of strength members 204.

According to some aspects, the impeller 102 (i.e., an apparatus) includes a central structural member 202, a hub 124, a plurality of strength members 204 coupled to the central structural member 202 and the hub 124, and a plurality of core blades 128 coupled to the hub 124 on a side opposite to the plurality of strength members 204. The impeller 102 also includes a shroud 122 radially outboard of the central structural member 202, the hub 124, the plurality of strength members 204, and the plurality of core blades 128; the plurality of core blades 128 may be coupled to the shroud 122 and the hub 124. The impeller 102 may also include the plurality of bypass blades 132 coupled to the shroud 122 on a side opposite to the plurality of core blades 128.

In some examples, the central structural member 202, the hub 124, the plurality of strength members 204, the plurality of core blades 128, the shroud 122, and the plurality of bypass blades 132 may be three-dimensionally (3D) printed as an integral unit. In some examples, the integral unit may be 3D printed with metal. In some examples, each of the plurality of strength members 204 may be aligned with a corresponding one of the plurality of core blades 128.

According to some aspects, the impeller 102 may include a plurality of splitter blades 130, coupled to the hub 124, on a side opposite to the plurality of strength members 204, each respective splitter blade (of the plurality of splitter blades 130) being aligned with a corresponding respective strength member of the plurality of strength members 204. In some examples, the central structural member 202, the hub 124, the plurality of strength members 204, the plurality of core blades 128, the shroud 122, the plurality of bypass blades 132, and the plurality of splitter blades 130 are three-dimensionally (3D) printed as an integral unit.

According to some aspects, the impeller 102 may further include a backplate 136 coupled to trailing edges of the plurality of core blades 128, the plurality of splitter blades 130, the hub 124, and the central structural member 202. In some examples, the central structural member 202, the hub 124, the plurality of strength members 204, the plurality of core blades 128, the shroud 122, the plurality of bypass blades 132, the plurality of splitter blades 130, and the backplate 136 are three-dimensionally (3D) printed as an integral unit.

In some examples, the central structural member 202, the hub 124, the plurality of strength members 204, the plurality of core blades 128, the shroud 122, the plurality of bypass blades 132, and the plurality of splitter blades 130 may be configured as a first integral unit. The backplate 136 may be a separate second unit configured to be coupled to the first integral unit.

According to some aspects, a first configuration of the plurality of bypass blades 132 may be independent of a second configuration of the plurality of core blades 128. According to such aspects, the first configuration of the plurality of bypass blades 132 may be configured to obtain optimal bypass air. The second configuration of the plurality of core blades 128 may be configured to obtain optimal core air. Both the first configuration and the second configuration may rotate as one unit coupled to the central structural member 202.

According to some aspects, the central structural member 202, the hub 124, and the plurality of strength members 204 form a solid unit (a single solid unit, a single solid hub, a unitary solid unit) having the hub outer surface 410. In other words, the central structural member 202, the hub 124, and the plurality of strength members 204 are formed as a solid unit (a single solid unit, a single solid hub, a unitary solid unit) having the hub outer surface 410. According to some aspects, the central structural member 202 and the hub 124 form a solid unit (a single solid unit, a single solid hub, a unitary solid unit) having the hub outer surface 410 in an absence of the plurality of strength members 204. In other words, the central structural member 202 and the hub 124 may form a solid unit (a single solid unit, a single solid hub, a unitary solid unit) in the absence of the plurality of strength members 204.

FIG. 6 is a right-side cross-section view of the impeller 102 of FIGS. 1, 2, 3, 4, and 5 according to some aspects of the disclosure. The cross-section is taken in the plane 6-6 as illustrated in FIG. 3. The features of the impeller 102 illustrated in FIG. 6 include the shroud 122, the hub 124, the stub shaft 134, the central structural member 202, the plurality of strength members 204, the plurality of core blades 128, the plurality of bypass blades 132, the bypass air region 112, and the core air region 114. Also illustrated in FIG. 6 in connection with the hub 124 is the hub first diameter 606 and a hub second diameter 608, larger than the hub first diameter 606.

For reference, FIG. 6 identifies a first leading edge 614 of one of the plurality of core blades 128 and a second leading edge 616 of one of the plurality of splitter blades 130. Also illustrated in FIG. 6 is a Hirth coupling 602 received within a threaded hole 604 defined by threaded internal sidewalls of the central structural member 202. The Hirth coupling 602 may be used to couple to a shaft (not shown) of the compressor stages of a turbofan jet engine, such as the jet engine 100, as shown and described in connection with FIG. 1. The Hirth coupling 602 is characterized by tapered teeth that mesh together on the end faces of the Hirth coupling 602 and a mating Hirth coupling on a compressor stage shaft (not shown). Hirth couplings are a subset of curvic couplings; the difference is that their teeth are planar instead of curved surfaces. Hirth couplings and curvic couplings lock components together and provide torque transfer and centering between the central structural member 202 and the compressor stage shaft (not shown).

FIG. 6 also provides an example of the incorporation of void spaces (e.g., void space 610) between the hub inner surface 408 and the central structural member outer surface 612. The void spaces may be defined by the hub inner surface 408, the central structural member outer surface 612, and the outer surfaces of the plurality of strength members 204. Incorporating void spaces (such as void space 610) reduces the weight of the impeller 102 compared to using an impeller with a solid hub (such as the solid hub 904 of the second impeller 902, FIG. 9B).

It is noted that the use of strength members (such as the plurality of strength members 204) is distinguishable from the use of "infill," as that term is used and understood in the technology of 3D printing. The term and concept of infill in 3D printing describe a patterned filling structure (e.g., 3D cross-hatched or honeycomb structures, etc.) used within relatively thin walls of a given structure. Infill replaces the solid interior of a wall, for example, to save time and material in the 3D printing of a given structure. Infill is delicate and would have a plurality of random points where the given structure could break. To avoid such random points of failure in the aspects described herein, the plurality of strength members 204 is employed. Each of the plurality of strength members 204 is similar to an airfoil structure and produces similar mode shapes as airfoils. A mode shape may be understood as a deflection pattern related to a particular natural frequency. The mode shape may represent a relative displacement of all parts of a structure for a given mode. Aspects of structures described herein avoid excessive numbers of modes compared to structures that utilize infill and would produce excessive numbers of modes. In the examples described herein, the plurality of strength members 204 carry their respective loads to the central structural member 202 under respective airfoils (i.e., under the plurality of respective strength members), which may minimize the surface area where inclusions and cracks may form.

As observable in FIG. 6, a first configuration of the plurality of bypass blades 132 is independent of a second configuration of the plurality of core blades 128. In other words, the geometry of the plurality of bypass blades 132 in the bypass air region 112 is independent of the geometry of the plurality of core blades 128 and the plurality of splitter blades 130 in the core air region 114. By separating the two regions with the shroud 122, the design of the plurality of core blades 128 (and the plurality of splitter blades 130) can be optimized for core airflow, and the design of the plurality of bypass blades 132 can be optimized for bypass airflow. Accordingly, utilization of aspects described herein may allow for independence (e.g., complete independence, complete decoupling) of the designs and structures utilized in the bypass air region 112 and the core air region 114. For example, there is no need to tie the metal angles of the plurality of core blades 128 in the core air region 114 (e.g., where the core air stream flows) to the metal angles of the plurality of bypass blades 132 in the bypass air region 112 (e.g., where the bypass air stream flows).

Figure 7:
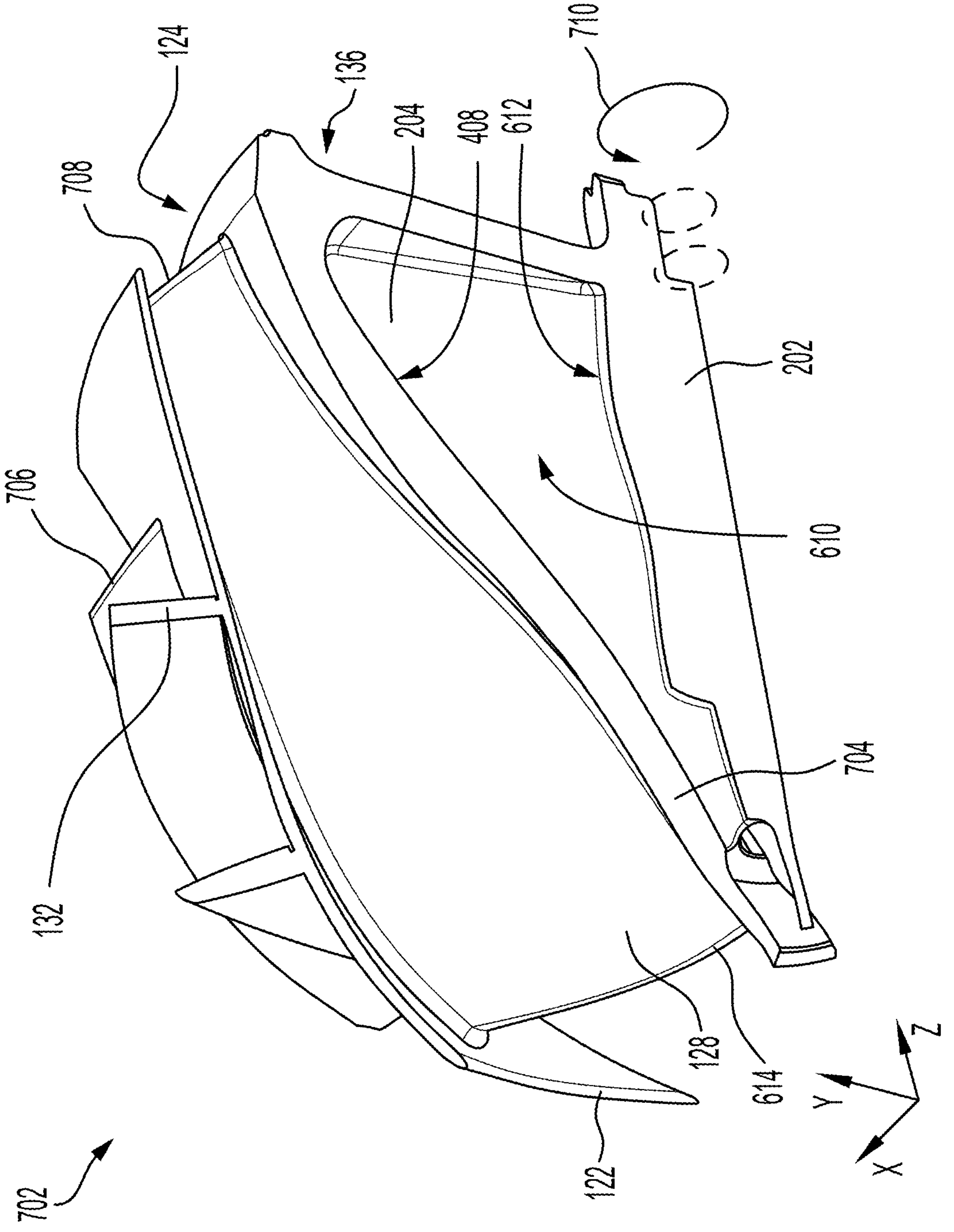
FIGS. 7 and 8 are representations of portions of the impeller of FIGS. 1, 2, 3, 4, 5, and 6 that may be used in finite element analysis models according to some aspects of the disclosure.
Figure 8:
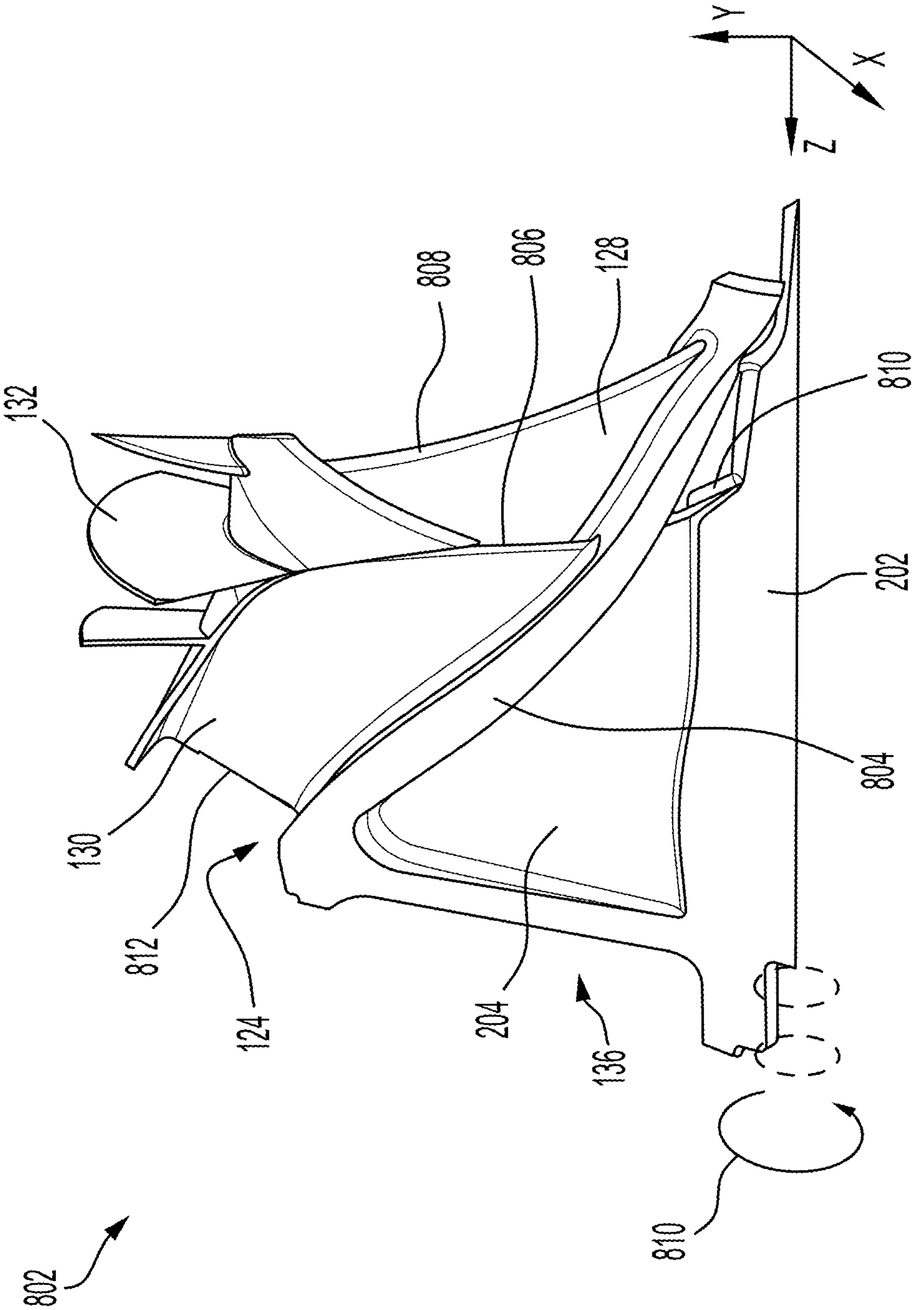

FIG. 7 is a representation of a first section 702 of the impeller 102 of FIGS. 1, 2, 3, 4, 5, and 6 according to some aspects of the disclosure. FIG. 8 is a representation of a second section 802 of the impeller 102 of FIGS. 1, 2, 3, 4, 5, and 6 according to some aspects of the disclosure. A first periodic surface 704 (FIG. 7), mates/meshes with a second periodic surface 804 (FIG. 8). The first periodic surface 704 and the second periodic surface 804 represent cut surfaces. Both FIGS. 7 and 8 are based on the impeller 102 as shown and described in connection with FIGS. 1-6.

With reference to FIG. 7, the impeller 102 as shown and described in connection with FIGS. 1-6 utilizes the plurality of strength members 204 (also referred to as spokes herein) between the central structural member outer surface 612 of the central structural member 202 and the hub inner surface 408 (i.e., the inner surface of the hub 124). The volume occupied between the central structural member outer surface 612 of the central structural member 202, the hub inner surface 408, and the surfaces of the plurality of strength members 204 includes voids, such as void space 610. The shroud 122 may be a rotating shroud. The rotating shroud 122 may be axisymmetric (e.g., a radial rotating splitter). A plurality of bypass blades 132 are coupled to the shroud 122. A first trailing edge 706 of one of the plurality of bypass blades 132 is identified in FIG. 7 for reference purposes. A second trailing edge 708 of one of the plurality of core blades 128 is also identified in FIG. 7 for reference purposes. The backplate 136 is also identified in FIG. 7 for reference purposes. A clockwise rotating arrow 710 in the XY plane indicates a direction of rotation of the hub 124 and is also identified in FIG. 7 for reference purposes.

With reference to FIG. 8, a trailing edge 812 and a leading edge 806 of one of the plurality of splitter blades 130 are shown in FIG. 8 for reference purposes. A leading edge 808 of one of the plurality of core blades 128 is shown in FIG. 8 for reference purposes. A portion 810 of one of the plurality of strength members 204 204 is shown in FIG. 8 for reference purposes. In more detail, the portion 810 of the one of the plurality of strength members 204 may be an axially facing surface of the one of the plurality of strength members 204. The axially facing surface (i.e., the portion 810) of the one of the plurality of strength member 204 may be generally aligned with a forward position of the one of the plurality of strength members 204. As described and illustrated herein, each of the plurality of strength members 204 may be referred to as a radial spoke that strengthens the impeller 102. A counter-clockwise rotating arrow 814 in the XY plane that indicates a direction of rotation of the hub 124 is also identified in FIG. 7 for reference purposes.

FIG. 8 is the same as FIG. 7 but shows the other side of the cut. In FIG. 8, the plurality of strength members 204 (also referred to as spokes herein) extending from the central structural member 202 are aligned with the plurality of core blades 128 and the plurality of splitter blades 130. It is noted that the trailing edges (not visible in FIG. 8) of the plurality of core blades 128 and the plurality of splitter blades 130 are the same. The splitter blades are shorter, lengthwise, compared to the plurality of core blades 128.

The representations of the first section 702 (FIG. 7) and the second section 802 (FIG. 8), as shown and described in connection with FIGS. 7 and 8, respectively, may be used as analysis sections. The first section 702 and the second section 802 represent sectors cut from the impeller 102 and align with each other. The sectors align with the plurality of core blades 128 and the plurality of strength members 204. Some of the plurality of bypass blades 132 are cut through a curved surface in the figures.

FIGS. 9A and 9B are side-by-side right-side cross-section views of two types of impellers according to some aspects of the disclosure. FIG. 9A depicts a cross-section of the impeller 102 of FIGS. 1-6. The impeller 102 incorporates the plurality of strength members 204 between a central structural member 202 and a hub 124. FIG. 9B depicts a second impeller 902 incorporating a solid hub 904 according to some aspects of the disclosure.

In contrast to the solid hub 904 of the second impeller 902 of FIG. 9B, the impeller 102 of FIG. 9A includes void spaces (e.g., void space 610) defined by facing surfaces of the hub 124, the central structural member 202, and respective surfaces of the plurality of strength members 204.

Figure 10A:
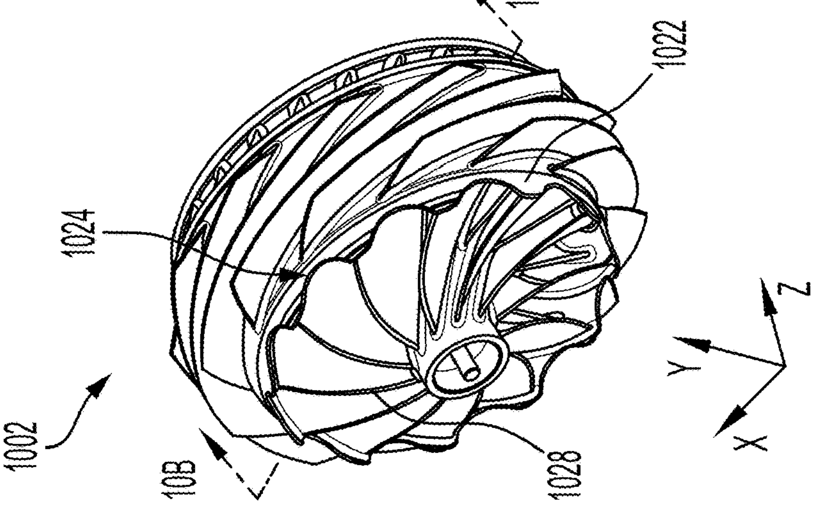
FIGS. 10A through 10D are various views of an impeller, similar to the impeller of FIG. 9B, according to some aspects of the disclosure.
Figure 10B:
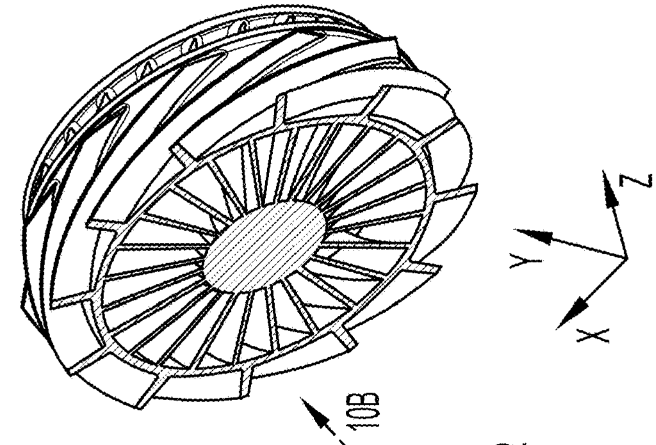
Figure 10C:
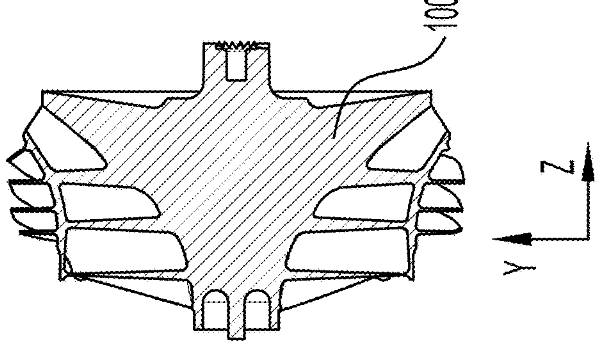
Figure 10D:
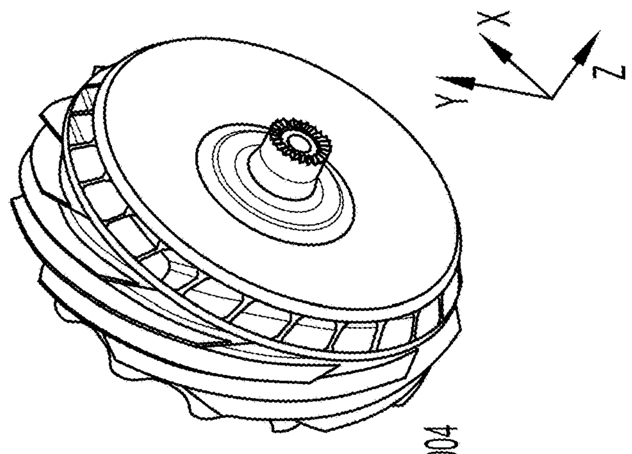

FIGS. 10A through 10D are four views of an impeller 1002, similar to the second impeller 902 of FIG. 9B, according to some aspects of the disclosure. As shown in FIG. 10A, the shroud 1022 (also referred to as a "rotating shroud" because the shroud 1022 may be formed integral to and therefore may rotate with the impeller 1002) has a scalloped shape 1024 (e.g., a wavy shape, a non-axisymmetric shape). The scalloped shape 1024 may reduce stress. FIG. 10C depicts a solid hub 1004, similar to the solid hub 904 of FIG. 9B. FIG. 10B is a cross section of FIG. 10A, taken along the plane 10B-10B in the XY plane. FIG. 10C is a right-side cross-section view of the impeller 1002. FIG. 10D is a right-rear perspective view of the impeller 1002.

Figure 11:
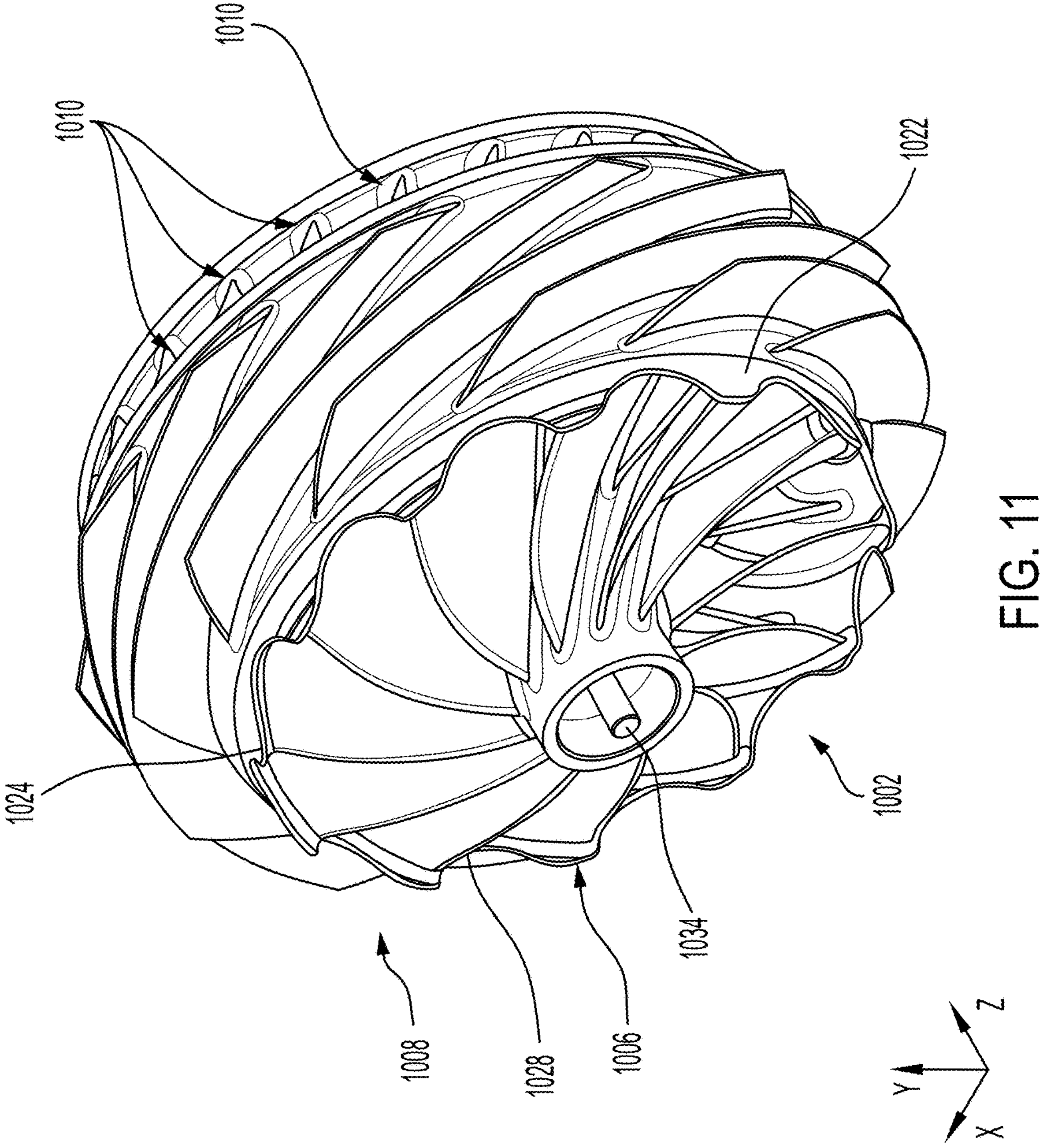
FIG. 11 is an enlarged version of the impeller of FIG. 10A according to some aspects of the disclosure.

FIG. 11 is an enlarged version of the impeller 1002 of FIG. 10A according to some aspects of the disclosure. As depicted, there is a one-to-one correspondence between each of the plurality of core blades 1028 and the scalloped shape 1024. Each apex of the scalloped shape 1024 may be aligned with a respective one of the plurality of core blades 1028. Additionally, the thickness of each scallop may thin towards the leading of each scallop (i.e., toward the leading edge of the scalloped shape 1024) or have any general thickness distribution that meets the stress criteria for design. An inflow stream 1006 (e.g., a core stream) and a bypass stream 1008 are shown in FIG. 11 for reference purposes. Additionally, core blade trailing edges 1010 of some of the plurality of core blades 1028 are shown for reference purposes. An optional stub shaft 1034 (having no through shaft, no borehole) is also shown for reference purposes.

The term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object.

One or more of the components, steps, features and/or functions illustrated in FIGS. 1-11 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein but are to be accorded the widest scope consistent with this disclosure, the principles and the novel features disclosed herein.

What is claimed is:

1. An apparatus comprising:

a central structural member;

a hub;

a plurality of strength members coupled to the central structural member and the hub;

a plurality of core blades coupled to the hub on a side opposite to the plurality of strength members;

a shroud radially outboard of the central structural member, the hub, the plurality of strength members, and the plurality of core blades, the plurality of core blades coupled to the shroud and the hub; and a plurality of bypass blades coupled to the shroud on a side opposite to the plurality of core blades, wherein each of the plurality of strength members is aligned with a corresponding one of the plurality of core blades.

2. The apparatus of claim 1, wherein the central structural member, the hub, the plurality of strength members, the plurality of core blades, the shroud, and the plurality of bypass blades are three-dimensionally (3D) printed as an integral unit.

3. The apparatus of claim 2, wherein the integral unit is 3D printed with metal.

4. The apparatus of claim 1, further comprising a plurality of splitter blades, coupled to the hub on a side opposite to the plurality of strength members, each respective splitter blade being aligned with a corresponding respective strength member.

5. The apparatus of claim 4, wherein the central structural member, the hub, the plurality of strength members, the plurality of core blades, the shroud, the plurality of bypass blades, and the plurality of splitter blades are three-dimensionally (3D) printed as an integral unit.

6. The apparatus of claim 4, further comprising a backplate coupled to trailing edges of the plurality of core blades, the plurality of splitter blades, the hub, and the central structural member.

7. The apparatus of claim 6, wherein the central structural member, the hub, the plurality of strength members, the plurality of core blades, the shroud, and the plurality of bypass blades, the plurality of splitter blades, and the backplate are three-dimensionally (3D) printed as an integral unit.

8. The apparatus of claim 1, wherein a first configuration of the plurality of bypass blades is independent of a second configuration of the plurality of core blades.

9. The apparatus of claim 1, wherein the central structural member and the hub form a solid unit, in an absence of the plurality of strength members.

10. An apparatus, comprising:

a central structural member defining a longitudinal center axis and having an air inflow end and an air outflow end distal from the air inflow end;

a plurality of strength members, each having a respective strength member root coupled to and extending from the central structural member, a respective strength member body extending from the respective strength member root, and a respective strength member tip extending from the respective strength member body distal from the respective strength member root;

a hub having a hub inner surface, a spaced apart hub outer surface, a hub first diameter adjacent to the air inflow end, and a hub second diameter, larger than the hub first diameter, adjacent to the air outflow end, each respective strength member tip coupled to the hub inner surface;

a plurality of core blades, each having a respective core blade root coupled to and extending from the hub outer surface, a respective core blade body, and a respective core blade tip distal from the respective core blade root, a hub thickness being interposed between a plurality of strength member tips and a plurality of core blade roots;

a shroud having a shroud inner surface, a spaced apart shroud outer surface, each respective core blade tip coupled to the shroud inner surface; and a plurality of bypass blades each having a respective bypass blade root, a respective bypass blade body, and a respective bypass blade tip, each of the plurality of bypass blades coupled to and extending from the shroud outer surface.

11. The apparatus of claim 10, wherein the strength member body is a curved strength member body, and the core blade body is a curved core blade body.

12. The apparatus of claim 10, wherein the central structural member, the plurality of strength members, the hub, the plurality of core blades, the shroud, and the plurality of bypass blades are three-dimensionally (3D) printed as an integral unit.

13. The apparatus of claim 12, wherein the integral unit is 3D printed with metal.

14. The apparatus of claim 10, wherein respective ones of the plurality of core blade tips are unaligned with respective ones of the bypass blade roots.

15. The apparatus of claim 10, wherein each respective core blade root is aligned with the respective strength member tip.

16. The apparatus of claim 10, further comprising a plurality of splitter blades, each having a respective splitter blade root coupled to and extending from the hub outer surface, and a respective splitter blade tip distal from the respective splitter blade root, the respective splitter blade root being aligned with a strength member tip of a corresponding respective strength member.

17. The apparatus of claim 16, wherein the central structural member, the plurality of strength members, the hub, the plurality of core blades, the shroud, the plurality of bypass blades, and the plurality of splitter blades are three-dimensionally (3D) printed as an integral unit.

18. The apparatus of claim 16, further comprising a backplate coupled to trailing edges of the plurality of core blades, the plurality of splitter blades, the hub, and the hub.

19. The apparatus of claim 18, wherein the central structural member, the plurality of strength members, the hub, the plurality of core blades, the shroud, the plurality of bypass blades, the plurality of splitter blades, and the backplate are three-dimensionally (3D) printed as an integral unit.

* * * * *